United States Patent [19]
Glass et al.

[11] 3,871,115
[45] Mar. 18, 1975

[54] LANGUAGE COMMUNICATOR
[76] Inventors: Earl J. Glass, 225 Westmoreland, Wilmette, Ill. 60091; Gerald S. Geren, 79 E. Greenbriar Dr., Deerfield, Ill. 60015
[22] Filed: Apr. 30, 1973
[21] Appl. No.: 356,061

[52] U.S. Cl.................. 35/35 E, 283/46, 40/104.02
[51] Int. Cl. ........................................... G09b 19/08
[58] Field of Search....... 35/35 R, 35 E, 35 F, 35 G, 35/35 H, 35 J; 283/46; 40/104.02, 104.03

[56] References Cited
UNITED STATES PATENTS

| | | | |
|---|---|---|---|
| 577,886 | 3/1897 | Snyder | 283/46 |
| 2,385,452 | 9/1945 | Lande | 35/35 |
| 3,271,884 | 9/1966 | Roberson | 35/35 E |
| 3,363,349 | 1/1968 | Nelson | 40/104.03 |

Primary Examiner—Wm. H. Grieb
Attorney, Agent, or Firm—Lettvin and Gerstman

[57] ABSTRACT

A multiple flip-chart device of a size to be carried in a pocket or purse to permit a basic level of communication between persons who only speak languages foreign to each other. The device includes at least two side-by-side flip-chart sections: one section has sheets bearing at least the predicate of a sentence (usually a question) written out in the foreign language; and the other of the sections has, in symbolic or pictogram form, the subject of the sentence or a response to a question. By viewing the device, a complete sentence can be non-verbally communicated and in certain situations answers to questions may be selected from pictograms on the charts.

6 Claims, 7 Drawing Figures

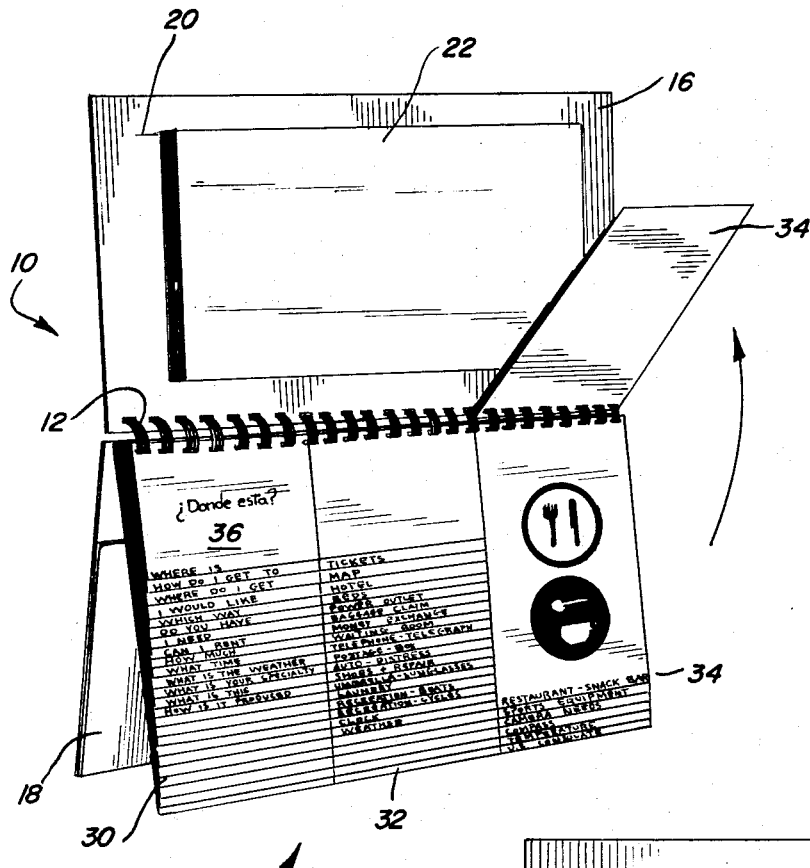

FIG. 4

¿Donde esta?

| WHERE IS | | |
|---|---|---|
| HOW DO I GET TO | TICKETS | |
| WHERE DO I GET | MAP | |
| I WOULD LIKE | HOTEL | |
| WHICH WAY | BEDS | |
| DO YOU HAVE | POWER OUTLET | |
| I NEED | PORTER | |
| CAN I RENT | BAGGAGE CLAIM/CHECK | TRAIN STATION |
| HOW MUCH | MONEY EXCHANGE | TRAIN SEAT - SLEEPER |
| WHAT TIME | WAITING ROOM | BATH - SHOWER |
| WHAT IS THE WEATHER TODAY/TOMRW | TELEPHONE - TELEGRAPH | TOLIET (W.C.) |
| WHAT IS YOUR SPECIALTY | POSTAGE - BOX | AUTO NEEDS (FUEL ETC) |
| WHAT IS THIS | AUTO - DISTRESS | AUTO NEEDS (REPAIR) |
| HOW IS IT PREPARED | SHOES + REPAIR | POLICE-DOCTOR-AMBULANCE |
| | UMBRELLA - SUNGLASSES | BARBER BEAUTY SHOP |
| | LAUNDRY | PHARMACY |
| | RECREATION - BOATS | PERSONAL NEEDS |
| | RECREATION - CYCLES | RESTURANTS - SNACK BAR |
| | CLOCK | SPORTS EQUIPMENT |
| | WEATHER | CAMERA NEEDS |
| | | COMPASS |
| | | TEMPERATURE |
| | | U.S. CONSULATE |

FIG. 5

Yo necesito

| | TICKETS | |
|---|---|---|
| | MAP | |
| | HOTEL | |
| | BEDS | |
| | POWER OUTLET | |
| I NEED | PORTER | |
| CAN I RENT | BAGGAGE CLAIM/CHECK | |
| HOW MUCH | MONEY EXCHANGE | |
| WHAT TIME | WAITING ROOM | |
| WHAT IS THE WEATHER TODAY/TOMRW | TELEPHONE - TELEGRAPH | |
| WHAT IS YOUR SPECIALTY | POSTAGE - BOX | |
| WHAT IS THIS | AUTO - DISTRESS | |
| HOW IS IT PREPARED | SHOES + REPAIR | POLICE - DOCTOR - AMBULANCE |
| | UMBRELLA - SUNGLASSES | BARBER BEAUTY SHOP |
| | LAUNDRY | PHARMACY |
| | RECREATION - BOATS | PERSONAL NEEDS |
| | RECREATION - CYCLES | RESTURANTS - SNACK BAR |
| | CLOCK | SPORTS EQUIPMENT |
| | WEATHER | CAMERA NEEDS |
| | | COMPASS |
| | | TEMPERATURE |
| | | U.S. CONSULATE |

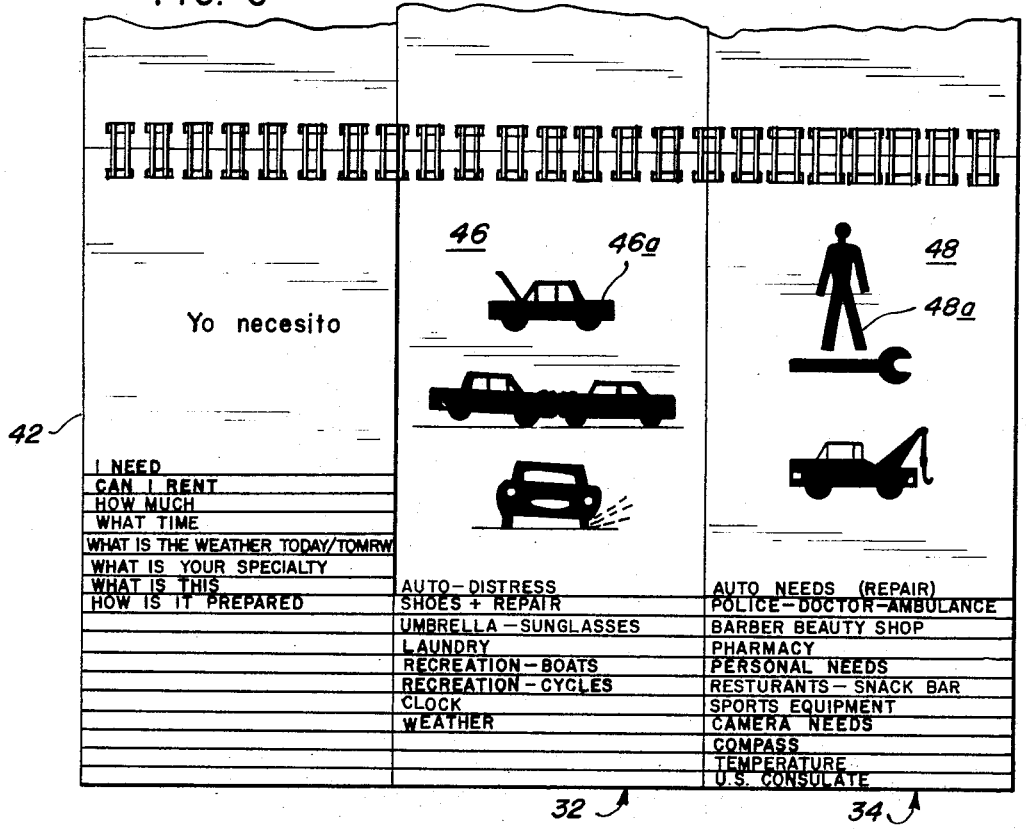
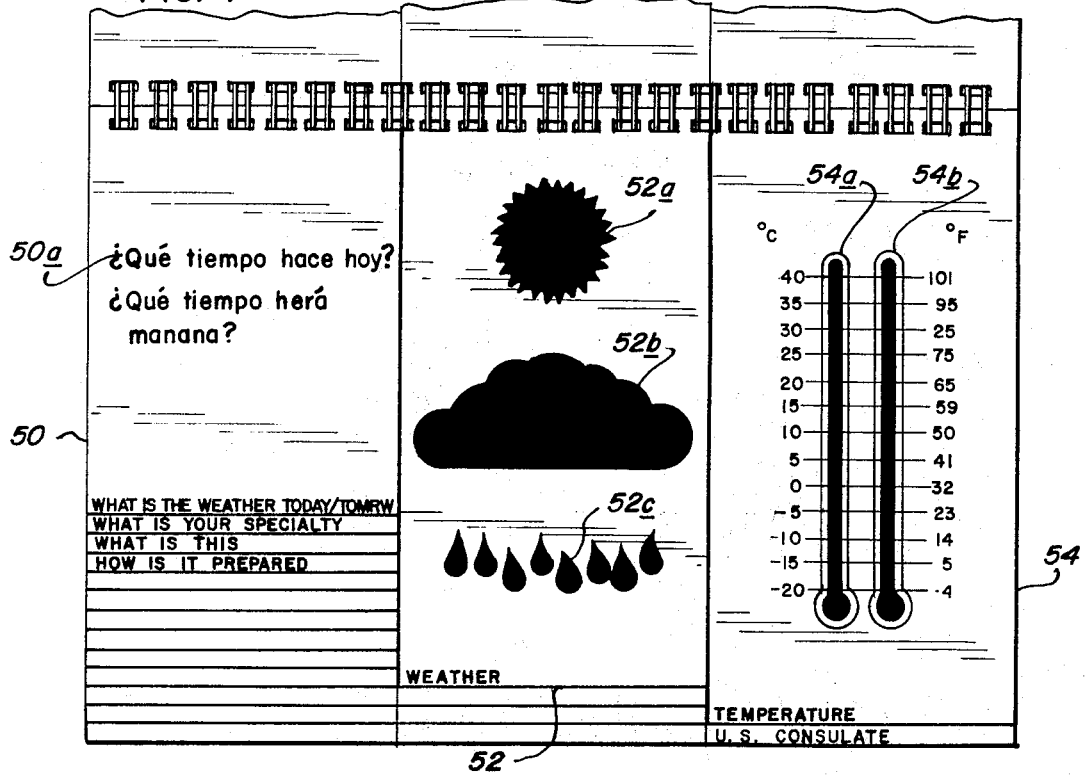

1

LANGUAGE COMMUNICATOR

BACKGROUND OF THE INVENTION

This invention relates to a device to assist travelers in foreign countries to communicate with residents thereof who do not speak of traveler's language.

Travelers in foreign countries, who do not speak the language of that country, commonly meet with difficulty in communicating their basic needs and desires to residents of that country. This difficulty arises for several reasons which include: the inability of the resident to speak the traveler's language; the inability of the traveler to intelligibly and understandably speak the resident's language; and the inability of the traveler to understand spoken answers or replies.

Numerous devices are available which attempt to solve these problems. These devices include phonetic pronounciation dictionaries which help the traveler to ask a question or express a need. However, these present two problems: first, correct pronounciation of the question; and second, understanding the answer.

A presently available indexed book of line drawings with two questions for phonetic pronounciation is also available, where the question is to be asked verbally while pointing to a drawing. However, this book is structurally arranged so as to be inconvenient to use and depends upon the traveler's ability to pronounce the question. Another device is available which includes rows of phrases which can be matched by small slide indicators to provide a complete sentence. This is also inconvenient to use due to its structure, it does not elicit a quick response and may require a spoken response.

It is therefore an object of this invention to provide a conveniently-used device for providing basic communication between a traveler in and resident of a foreign country while minimizing or avoiding the problems of expressing or understanding the spoken word.

These and other objects will become apparent from the following description and appended claims.

SUMMARY OF THE INVENTION

There is provided by this invention a device which employs recognizable and readily identifiable symbols or pictograms in conjunction with written words from the foreign language. In one embodiment, the written words and pictograms together define a complete sentence to be directed to a resident of the foreign country. Usually the sentence is a question and the written words form the predicate of the sentence and the pictogram forms the subject. In another embodiment, the complete sentence can be in written form and the answer may be selected from one or more associated pictograms.

In general, the responses will be in the form of pointing to a close object, indicating on a map, sketching on a pad or re-employing pictograms in the device. By using adjacent flip-charts having different written words and many pictograms, numerous sentences and be formed and responses provided for.

BRIEF DESCRIPTION OF THE DRAWINGS

FIG. 1 is a perspective view of the communicator in an open position, showing the front and back covers and the flip-chart sections;

FIG. 2 is a plan view of the inside of the back cover;

FIG. 3 is a plan view of the inside of the front cover;

FIGS. 4, 5, 6 and 7 are plan views of the flip-chart sections showing different sheets of the charts.

DESCRIPTION OF THE PREFERRED EMBODIMENT

The communicator 10 is in notebook-style and includes a spiral binding 12 to which the center flip-chart section 14 generally, the front cover 16 and the back cover 18 are secured. The inside of the front cover 16 is provided with a longitudinal slot or pocket 20 for holding a pad of writing paper 22 by inserting the pad's back stiffener into the pocket. The back cover 18 has a generally longitudinally opening pocket 26 for carrying a map 28 or the like.

The center section 14 is shown with three adjacent flip-charts 30, 32 and 34. Each chart includes a plurality of sheets of paper, each of which are spiral-bound along the top edge. The sheets in each section are cut so that from front-to-back the sheets are progressively longer. For example, in chart 30 the front or top sheet 36 is the shortest with each sheet thereunder being successively longer. By so cutting the sheets, indexing indicia can be printed on the exposed portion or bottom margin of each sheet so as to provide a quick index system to assist the user in locating the desired sheets.

In one arrangement, sentences (usually questions) are formed by combining the written words (usually the predicate) with readily identifiable symbols or pictograms (usually the subject). Pictograms may be defined as pictorial representations of a person, place or thing. In another arrangement, a complete question is written on one sheet and multiple associated pictograms are provided on other sheets from which an answer to the question can be selected.

The left-hand chart section 30 includes a plurality of sheets, on each of which the predicate of the quesiton in the appropriate foreign language is written or printed. For example, sheet 36 of chart 30 has printed thereon the words "Donde esta" which is Spanish for "Where is", and along the bottom margin 36a "Where is" is printed in English for indexing purposes.

The center and right-hand chart sections 32 and 34 have pictograms thereon and indexing indicia in English on the margin of each sheet. For example, on sheet 40 there is shown a pictogram for a railroad station and along the bottom margin 40a "Train station" is printed in English for indexing purposes.

In use, a traveler wishing to determine the location of the station, would locate the "Where is" sheet and flip to the "Train station" pictogram sheet and show the communicator to a non-English speaking resident of that country. Immediately the resident would know that the traveler wanted to know the station's location and could communicate the location to him by pointing or gesturing (if the station were close) or by indicating on the map 28 if the station were far.

Using the phrase "Where is", numerous other questions can be formed by using different pictograms. For example, additional pictograms are provided for an airport, subway, bus, taxi, barber shop and the like. Thus using one written predicate and numerous pictograms, many questions can be conveyed.

The traveler might need to obtain emergency services and could locate the phrase "Yo necesito" (I need) on sheet 42, in Spanish. He would then flip to sheet 44 in chart 34 which shows a police car 44a, doctor 44b and ambulance 44c, and then he could point to one of the pictograms, the doctor, for example, thereby creating the sentence "I need a doctor". The citizen could reply by calling for a doctor or even taking the traveler to a doctor. Here again other pictograms can be used with "I need" such as pictograms for film, postage, toothpaste, sundries, etc.

Other variations include using the center 32 and right-hand 34 charts together so as to form more complex subjects. For example, when a driving traveler may wish to locate a mechanic to repair his car which has engine trouble, the traveler could use "I need" in combination with sheets 46 and 48 which are indexed as auto distress and auto needs (repairs), respectively. On sheet 46 the pictogram 46a depicts a car with its hood up which signifies engine trouble and on sheet 48 the pictogram 48a depicts a man with a wrench which signifies a mechanic.

It has been determined that for basic communication only a few predicates are necessary since in the most frequently used sentences the predicates are the same but the subject changes. For example, only 8 to 10 predicate phrases may be necessary, and perhaps 50 pictograms such as those for inter-city transportation, accommodations, emergencies, sundries, etc.

The basic predicates can include the following:
1. Where is
2. How do I get to
3. Where do I get
4. I would like
5. Which way
6. Do you have
7. I need
8. Can I rent
9. How much
10. What time The general categories of pictograms are the following:
1. Accommodations (i.e., hotel, motel, etc.)
2. Intra-city transportation (i.e., taxi, bus, subway, etc.)
3. Inter-city transportation (i.e., airplane, boat, train, etc.)
4. Restaurants, snack shops
5. Car problems (i.e., engine problems, flat tires, towing, etc.)
6. Emergencies (i.e., police, doctors, pharmacies)
7. Miscellaneous (i.e., sporting equipment, services, etc.)

By combining the basic predicates with the pictograms numerous sentences can be created which establish a basic level of communication.

In another arrangment, a complete sentence (usually a question) can be set out in written form and multiple pictograms can be provided from which a response to the sentence can be selected. For example, on sheet 50, the question "Que' tiempo hace hoy?" 50a (What is the weather today?) is written and on sheets 52 and 54 pictograms representing the sun 52a, clouds 52b, raindrops 52c and thermometers 54a and 54b (in Centrigrade or Fahrenheit) are provided. A resident can answer the question by pointing to the appropriate pictogram.

Using the structure provided herein, it is seen that the pictograms apply to any language and that in order to adapt the communicator for use in situations other than English-Spanish, all that need be done is to replace the first chart section 30 with words from another foreign language. Replacement with Greek renders the device an English-Greek communicator. Of course, the device can be arranged to work in any language combination.

It will be appreciated that numerous changes and modifications can be made to this embodiment without departing from the spirit and scope of the invention.

What is claimed and desired to be secured by Letters Patent of the United States is:

1. A foreign language communicator for permitting the user to communicate with one who understands little, if any, of the user's language, the improvement which comprises said communicator including a plurality of adjacent flip-chart means arranged in cooperative viewing relationship, each of said flip-chart means including a plurality of individual sheets, one of said flip-chart means having in written form on each of a plurality of sheets thereof, at least the predicate of a sentence in said foreign language and a second flip-chart means having on each of a plurality of sheets thereof at least one readily identifiable pictogram, for use in association and combination with said predicate so that when a sheet from said first chart and a sheet from said second chart are viewed together a basic level of communication is established and so as to provide for the selection of a plurality of combinations of said predicates and said pictograms.

2. A communicator as in claim 1 wherein the combination of said written language and said pictograms form a substantially complete sentence.

3. A communicator as in claim 2 wherein said sentence is a question.

4. A communicator as in claim 1 wherein the written language provides a substantially complete sentence and said pictograms associated therewith provides for a response to said sentence.

5. A communicator as in claim 4 wherein said sentence is in question.

6. A foreign language communicator for permitting the user to communicate with one who understands little, if any, of the user's language, the improvement which comprises said communicator including a plurality of adjacent flip-chart means arranged in cooperative viewing relationship, each of said flip-chart means including a plurality of individual sheets, one of said flip-chart means having in written form on each of a plurality of sheets thereof, at least the predicate of a sentence in said foreign language and a second flip-chart means having on each of a plurality of sheets thereof at least one readily identifiable pictogram, for use in association and combination with said predicate so that when a sheet from said first chart and a sheet from said second chart are viewed together a basic level of communication is established and so as to provide for the selection of a plurality of combinations of said predicates and said pictograms, wherein the sheets of said flipcharts are arranged so that a sheet is shorter than another sheet thereunder and longer than a third sheet thereabove, with there being provided indexing indicia in the language of the user, along the bottom edge of each sheet having said written language thereon and said pictograms thereon, so as to permit the user to quickly locate sheets having desired written language and pictograms thereon.

* * * * *

UNITED STATES PATENT OFFICE
CERTIFICATE OF CORRECTION

Patent No. 3,871,115　　　　　　　　　　Dated　March 18, 1975

Inventor(s)　Earl J. Glass and Gerald S. Geren

It is certified that error appears in the above-identified patent and that said Letters Patent are hereby corrected as shown below:

Column 1, line 6, change "of" to -- the -- .

Column 1, line 59, change "and" to -- can -- .

Column 3, line 21, change "to" to -- or -- .

Signed and sealed this 27th day of May 1975.

(SEAL)
Attest:

RUTH C. MASON
Attesting Officer

C. MARSHALL DANN
Commissioner of Patents
and Trademarks